W. A. GILL.
LUBRICATING MEANS FOR ROTATORS AND THEIR CASINGS.
APPLICATION FILED MAR. 15, 1915.

1,209,573.

Patented Dec. 19, 1916.

WITNESSES:

INVENTOR
Wm. A. Gill,
BY
ATTORNEY

W. A. GILL.
LUBRICATING MEANS FOR ROTATORS AND THEIR CASINGS.
APPLICATION FILED MAR. 15, 1915.
1,209,573.
Patented Dec. 19, 1916.
3 SHEETS—SHEET 3.
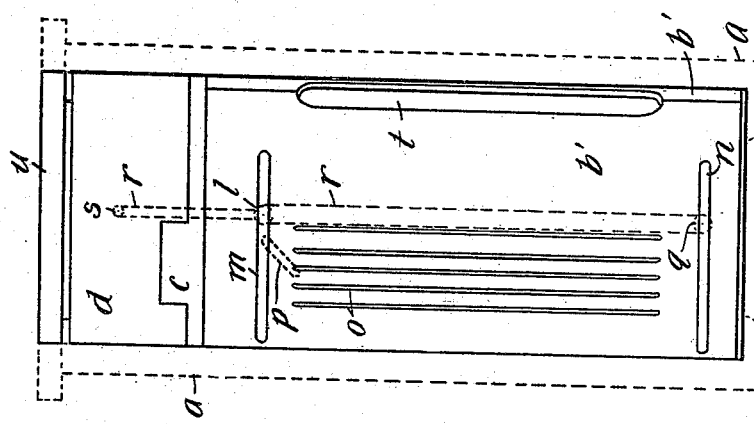
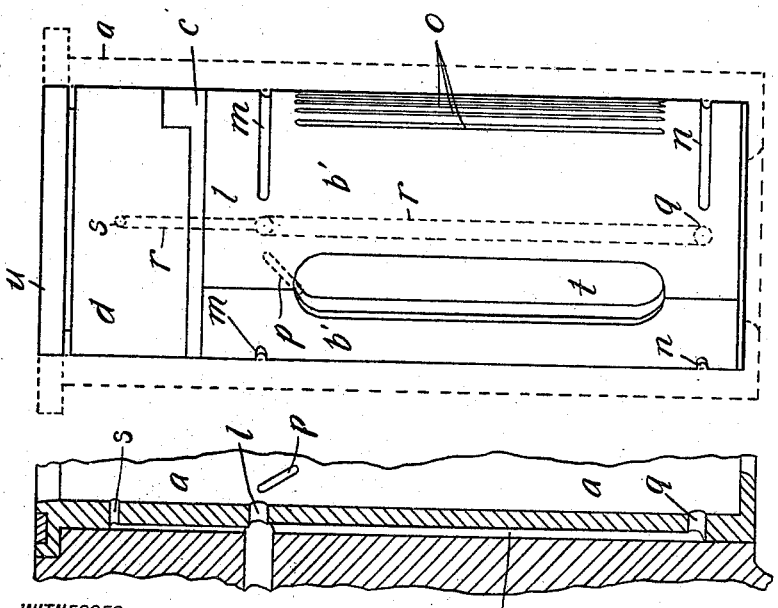
WITNESSES:
Wm. P. Schmitt
D. E. Crabb
INVENTOR
Wm. A. Gill,
BY
T. J. Geisler
ATTORNEY

UNITED STATES PATENT OFFICE.

WILLIAM A. GILL, OF PORTLAND, OREGON, ASSIGNOR TO GILL-COOK VALVE CO., OF PORTLAND, OREGON, A CORPORATION OF OREGON.

LUBRICATING MEANS FOR ROTATORS AND THEIR CASINGS.

1,209,573.  Specification of Letters Patent.  Patented Dec. 19, 1916.

Application filed March 15, 1915. Serial No. 14,623.

*To all whom it may concern:*

Be it known that I, WILLIAM A. GILL, a citizen of the United States, and a resident of Portland, county of Multnomah, and State of Oregon, have invented a certain new and useful Improvement in Lubricating Means for Rotators and Their Casings, of which the following is a specification.

The object of my invention is to provide means which will efficiently lubricate the opposed bearing faces of a rotator and the casing or cylinder in which it rotates, but not wastefully apply lubricant to such surfaces.

My invention further especially concerns rotary valves made of longitudinally divided segments, and in this connection the purpose of my invention is to provide efficient means for lubricating the bearing faces of the parts while at the same time preventing the lubricant from working into the interior of the valve between the divided faces of the valve segments, for such would cause undue carbonization of the interior of the combustion chamber and other undesirable conditions.

In order that my invention may be understood, it is convenient to refer in the first instance to the accompanying drawings, which show my invention specifically applied to said type of rotary valves made of longitudinally divided segments.

Figure 1:
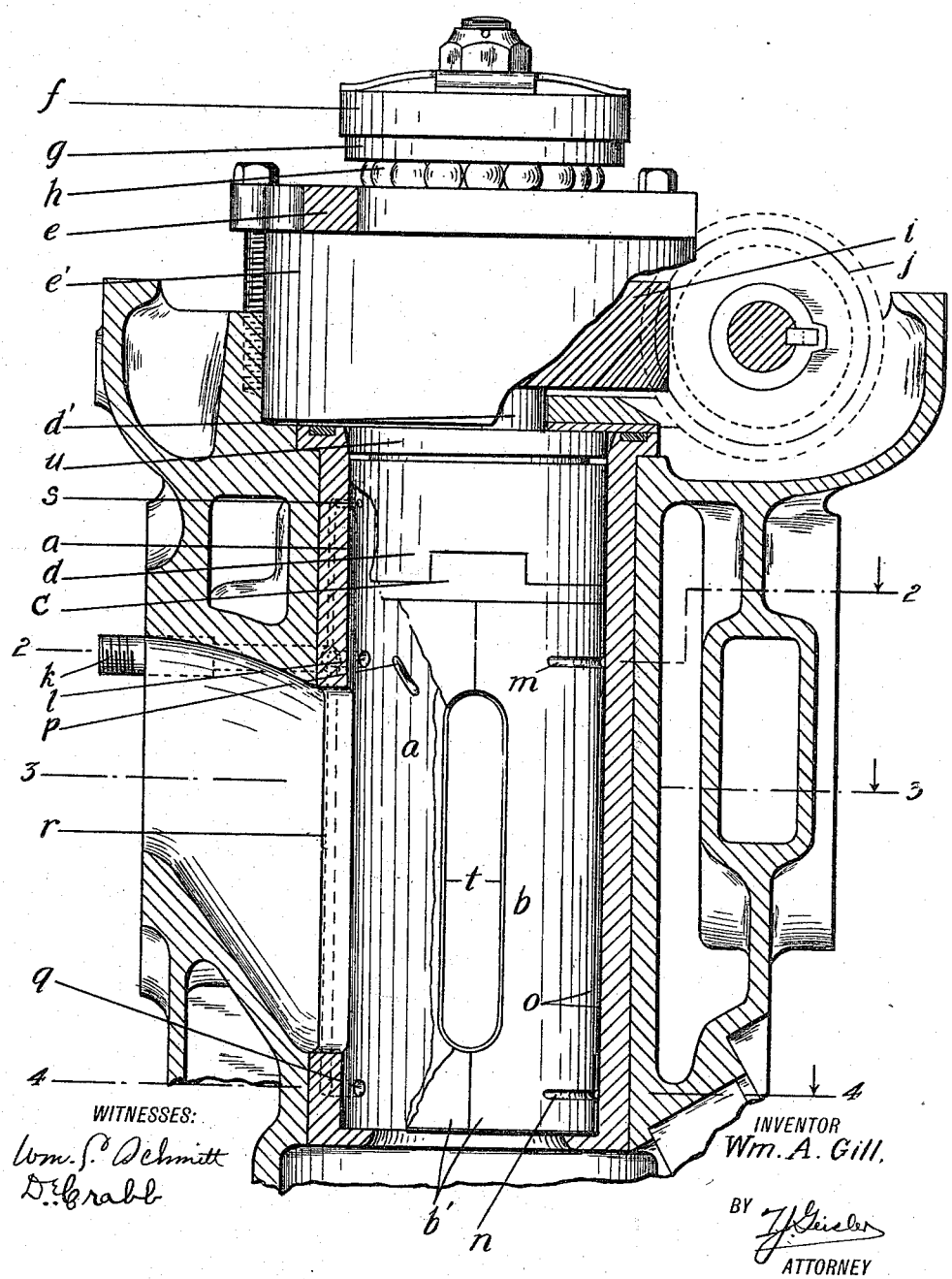
Figure 2:
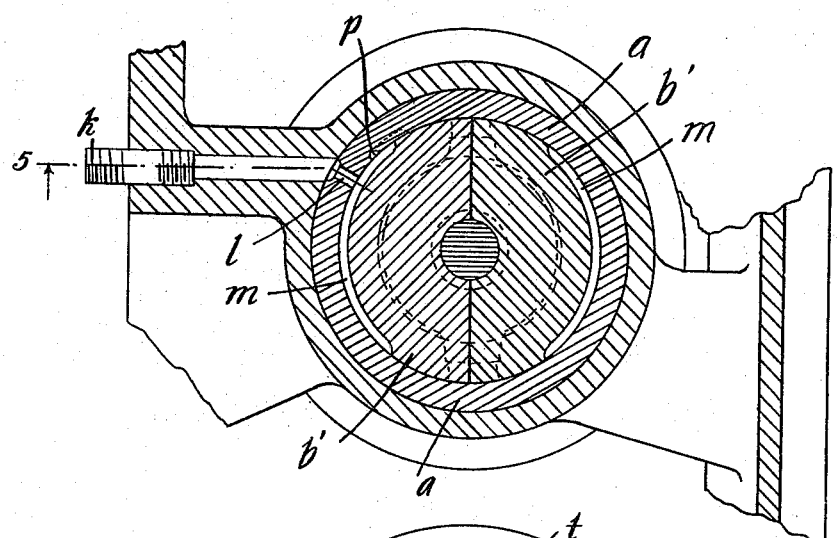
Figure 3:
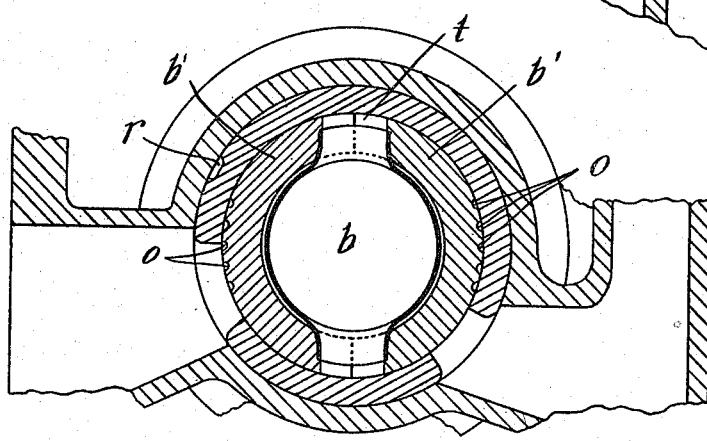
Figure 4:
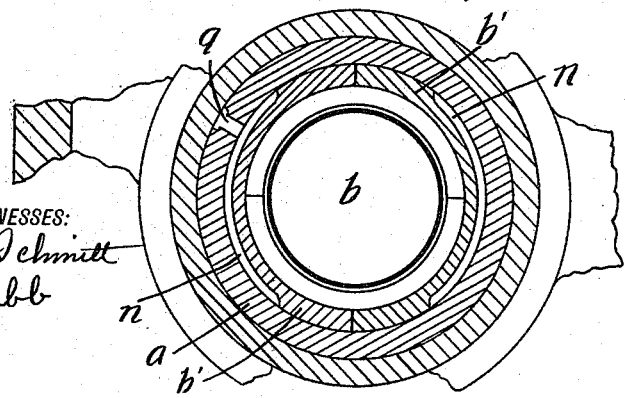

In such drawings, Figure 1 shows a diametric vertical section of a valve of the type referred to and its housing. The type of valve shown is similar to that as fully described in my application for Letters Patent of the United States filed March 26, 1915, under Serial No. 17,281. Fig. 2 is a plan section taken on the broken line 2—2 of Fig. 1; Fig. 3 is a plan section on the broken line 3—3 of Fig. 1; Fig. 4 is a plan section on the broken line 4—4 of Fig. 1; Fig. 5 is a sectional detail, taken in a vertical plane, on the line 5 of Fig. 2, showing a part of the hollow valve, and a part of the opposed wall of its casing and against which it bears; Fig. 6 is a diagrammatic view, showing the valve in side elevation and its casing in dotted outlines, and Fig. 7 is a view like Fig. 6, except that the valve is differently positioned.

A brief description of the parts shown in Fig. 1 will be here convenient.

$a$ is a valve chamber or cylinder in which rotates a valve $b$, made of longitudinally divided, detached segmental sections; the valve being hollow, and the driving fluid being conducted therethrough. On the valve $b$ is mounted a coupling $c$ of the Oldham type, which serves to connect the valve with a drive-head $d$, also located in the valve chamber above the valve. $e$ is a thrust-bearing plate rigidly supported on the frame of the casing. The drive-head is made with a stem $d'$ on the free end of which is secured a nut, not shown, but housed in the ring $f$, which is seated on plate $g$, by a ball-bearing $h$, on the upper face of the thrust bearing plate $e$. The latter is made with a chambered portion $e'$ in which there is mounted on the stem $d'$ of the drive-head $d$, a gear $i$, meshing with a drive pinion $j$, and by which means the valve $b$ is rotated. The valve casing is provided with a pipe $k$, leading from some source of lubricating oil under pressure, to a port $l$, leading to the inner face of the valve casing. Each of the segmental parts of the valve, such portions being designated $b'$, are provided near their upper and lower ends with segmental, circumferential grooves $m$, $n$. Said grooves are located medially between the dividing faces of the valve portions and do not extend to such dividing faces, so that no lubricant will be conducted to the dividing faces of the valve parts since, as mentioned in the introduction of this specification, one of the benefits resulting from the lubricating means invented by me is preventing the lubricant from working into the interior of the valve, since such would cause undue carbonization of the interior of the combustion chamber, and it would also cause fouling of the spark plug.

Each of the valve parts $b'$ is further provided with a series of longitudinally disposed grooves $o$, for the lubricant. These grooves $o$, as shown in Figs. 6 and 7, are located medially between the circumferential segmental grooves $m$, $n$, but the extremities of the grooves $o$ are spaced from the grooves $m$, $n$.

The casing $a$ is provided with a connector lubricating groove $p$. The connector groove $p$ is located intermediate of the horizontal plane of the circumferential groove $m$, and said connector groove $p$ is furthermore so disposed and made of such length that its extremities will extend over the circumferential groove m, and the upper extremities of the longitudinal groove o. The connector groove p is preferably located helically with respect to the axis of the valve b; that is to say, said groove has an inclination in the direction of the travel of the valve, the purpose of which is to promote the flow of the lubricant, preventing the latter from dragging. The circumferential lubricant groove at the lower end of the valve parts is supplied with lubricant by the port q at the lower end of the conduit r, extending in the valve casing, which conduit intersects the port l of the valve casing, and such conduit is provided at its upper end with a port s, which supplies lubricant to the exterior of the drive-head d.

t are recesses cut in the meeting faces of the valve parts, and provide an opening in the valve corresponding to the ports of the valve casing, as usual.

u is a closure plate for the top end of the valve chamber.

The parts not herein specifically described, are similar to like parts described in my said co-pending application for Letters Patent.

As the balve b rotates, the grooves m and n will register with the lubricant ports l and q, of the casing and will be filled with lubricant. As the valve rotates farther, the upper circumferential groove m will register with the upper end of the connector helical groove p, and lubricant will flow down the latter. The further rotation of the valve will bring the upper ends of the longitudinal grooves o into registration with the lower end of the connector groove p and lubricant will flow down said longitudinal grooves o. See Fig. 7. And it is to be noted that at no time will lubricant under pressure be supplied to the longitudinal grooves o while they are passing the ports of the valve casing.

I claim:

1. In a device of the character described, a casing made with a port for lubricant, leading from the exterior into the interior, a rotator, in the casing, provided with a circumferential lubricant groove located to pass over said port of the casing; the rotator being further provided with one or more longitudinal lubricant grooves; the casing being provided on its inner face with a connector lubricant groove, spaced from said lubricant port of the casing, and located intermediate of, and having its extremities extending to, said circumferential groove and said longitudinal groove of the rotator.

2. In a device of the character described, a casing made with a port for lubricant, leading from the exterior into the interior, a rotator in the casing, such rotator made of longitudinally divided sections, each of which is provided with a circumferential groove located between, but not extending to, the dividing faces of said sections, said groove located to pass over said port of the casing; each of said rotator sections being further provided with one or more longitudinal lubricant grooves located medially between the dividing faces of said sections, the casing being provided on its inner face with a connector lubricant-groove, spaced from said lubricant port of the casing, and located intermediate of, and having its extremities extending to, said circumferential groove and said longitudinal groove of the rotator.

3. In a device of the character described, a casing provided with a port for lubricant leading from the exterior into the interior, a rotator in the casing, provided with a circumferential segmental lubricant groove located to pass over said port of the casing, the rotator being further provided with a longitudinal lubricant groove; the casing being provided on its inner face with a connector lubricant groove spaced from said lubricant port of the casing, and located intermediate of, and having its extremities extending to said circumferential groove and said longitudinal groove of the rotator.

4. In a device of the character described, a casing provided with a port for lubricant leading from the exterior into the interior, a rotator in the casing, provided with a circumferential segmental lubricant groove located to pass over said port; the rotator being further provided with a series of longitudinal grooves, the casing being provided on its inner face with a connector lubricant groove, spaced from said lubricant port of the casing, and located intermediate of, and having its extremities extending to said circumferential groove and said longitudinal grooves of the rotator.

5. In a device of the character described, a casing provided with a port for lubricant leading from the exterior into the interior, a rotator, in the casing, provided with a circumferential segment lubricant groove located to pass over said port; the rotator being further provided with a longitudinal lubricant groove, the casing being provided on its inner face with a helically disposed connector lubricant groove, spaced from said lubricator port of the casing and located intermediate of, and having its extremities extending to said circumferential groove and said longitudinal groove of the rotator.

6. In a device of the character described, a casing provided with a port for lubricant leading from the exterior into the interior, a rotator, in the casing, provided with a circumferential segmental lubricant groove located to pass over said port; the rotator being further provided with a series of longitudinal grooves; the casing being provided on its inner face with a helically disposed connector lubricant groove spaced from said lubricant port of the casing and located intermediate of, and having its extremities extending to said circumferential groove, and said longitudinal grooves of the rotator.

7. In a device of the character described, a casing provided with a port for lubricant leading from the exterior into the interior, a rotator, in the casing, provided with a circumferential segmental lubricant groove located to pass over said port; the rotator being further provided with a longitudinal lubricant groove; the casing being provided on its inner face with a connector lubricant groove spaced from said lubricant port of the casing and located intermediate of, and having its extremities extending to said circumferential groove and said longitudinal groove of the rotator; the casing being further provided with a longitudinal conduit connected with its said lubricant port, and such conduit having a supplemental port leading into the interior of the casing.

WILLIAM A. GILL.

Witnesses:
Wm. C. Schmitt,
D. E. Crabb.

Copies of this patent may be obtained for five cents each, by addressing the "Commissioner of Patents, Washington, D. C."